United States Patent [19]
Gossett et al.

[11] Patent Number: 5,844,567
[45] Date of Patent: Dec. 1, 1998

[54] COMPUTER GRAPHICS SYSTEM AND METHOD FOR TEXTURE MAPPING USING TRIANGULAR INTERPOLATION

[75] Inventors: Carroll Philip Gossett, Mountain View, Calif.; Robert J. Moore, Maitland, Fla.

[73] Assignee: Silicon Graphics, Inc., Mountain View, Calif.

[21] Appl. No.: 695,938

[22] Filed: Aug. 12, 1996

[51] Int. Cl.$^6$ .................................................. G06F 15/00
[52] U.S. Cl. ................................................................ 345/430
[58] Field of Search .................................... 345/430, 425, 345/426, 429, 431, 432, 441, 442, 443

[56] References Cited

U.S. PATENT DOCUMENTS

| 4,727,365 | 2/1988 | Bunker et al. | 340/728 |
| 4,811,245 | 3/1989 | Bunker et al. | 364/521 |
| 5,367,736 | 11/1994 | Kato et al. | 345/425 |
| 5,680,525 | 10/1997 | Sakai et al. | 345/430 |

OTHER PUBLICATIONS

Andrews, Harry C. et al., "Digital Interpolation of Discrete Images," *IEEE Transactions on Computers*, vol. C–25, No. 2, Feb. 1976, pp. 195–201.

Bunker, w. Marvin et al., "Circles, Texture, Etc. Alternate Approaches to CIG Scene Detail," Technical Report, AIAA Flight Simulation Technologies Conference, Arlington, Texas, Sep. 18–20, 1978, pp. 49–58.

Catmull, Edwin Earl, "A Subdivision Algorithm for Computer Display of Curved Surfaces," A dissertation submitted to the faculty of the University of Utah in Partial Fulfillment of the Requirements for the Degree of Doctor of Philosophy, Department of Computer Science, University of Utah, Dec., 1974, pp. 1–77.

Crow, Franklin C., "The Aliasing Problem in Computer–Synthesized Shaded Images," A dissertation submitted to the faculty of the University of Utah in Partial Fulfillment of the Requirements for the Degree of Doctor of Philosophy, Department of Computer Science, University of Utah, Mar., 1976, pp. 1–96.

Crow, Franklin C., "A Comparison of Antialiasing Techniques", *IEEE CG&A*, Jan. 1981, pp. 40–49.

Dungan, Jr., et al., "Texture Tile Considerations for Raster Graphics," *Computer Graphics*, vol. 12, No. 3, 1978, pp. 130–134.

Heckbert, Paul S., "Survey of Texturing Mapping," *Graphics Interface 86 Vision Interface 86*, Computers Graphics Lab, New York Institute of Technology, pp. 207–212.

Williams, Lance, "Pyramidal Parametrics,"*Computer Graphics*, New York Institute of Technology, Old Westbury, New York, vol. 17, No. 3, Jul. 1983.

*Primary Examiner*—Phu K. Nguyen
*Attorney, Agent, or Firm*—Sterne, Kessler, Goldstein & Fox P.L.L.C.

[57] ABSTRACT

Texture mapping using triangular interpolation in a computer graphics system is discussed herein. A texture mapping module maps a pixel from an image space to a sample point in a texture space. The sample point has coordinates (si+sf, ti+tf). The texture mapping module identifies the three texels in the texture space that form a triangular region enclosing the sample point. The texture mapping module determines whether the triangular region represents a lower region or an upper region. If the triangular region represents a lower region, then a texture related value of the pixel mapped to the sample point is calculated by triangular interpolating on corresponding texture related values of the three texels according to the following equation:

texture related value = texel[$s, t$] +

(texel[$s + 1, t$] – texel[$s, t$]) * $sf$ + (texel[$s, t + 1$] – texel[$s, t$]) * $tf$.

If, instead, the triangular region represents an upper region, then a texture related value of the pixel mapped to the sample point is calculated by triangular interpolating on corresponding texture related values of the three texels according to the following equation:

texture related value = texel[$s + 1, t + 1$] +

(texel[$s, t + 1$] – texel[$s + 1, t + 1$]) * (1 – $sf$) +

(texel[$s + 1, t$] – texel[$s + 1, t + 1$]) * (1 – $tf$).

16 Claims, 6 Drawing Sheets

COMPUTER GRAPHICS SYSTEM AND METHOD FOR TEXTURE MAPPING USING TRIANGULAR INTERPOLATION

BACKGROUND OF THE INVENTION

1. Field of the Invention

The present invention relates generally to computer graphics, and more particularly to texture mapping using triangular interpolation.

2. Related Art

FIG. 1 illustrates an image (or display) space 102 and a texture space 104 of a computer graphics system. During texture mapping operations, it is necessary to determine the manner in which a texture in the texture space 104 affects the appearance of pixels in the image space 102. Conventionally, this is accomplished by mapping the pixels from the image space 102 to the texture space 104. (Of course, only those pixels affected by the texture can be mapped to the texture space 104.) Then, the color, intensity, transparency, and/or other texture related values of the mapped pixels are calculated based on the corresponding texture related values of pertinent texels in the texture space 104.

In the example of FIG. 1, pixel 120 in the image space 102 exactly maps to texel 116 in the texture space 104. Since pixel 120 exactly maps to texel 116, the value(s) of pixel 120 are set equal to the value(s) of texel 116.

Typically, however, pixels do not exactly map to texels. A more common case is represented by pixel 106, which maps to a sample point 116 in the texture space 104. The sample point 116 does not exactly coincide with any texel. The sample point 116 has coordinates (si+sf,ti+tf), where si and ti are the integer components in the S and T axes, respectively, and sf and tf are the fractional components in the S and T axes, respectively, sf is represented by distance 130 in FIG. 1, and tf is represented by distance 132.

Conventionally, a bilinear interpolation operation is performed to determine the texture related values of mapped pixels. In bilinear interpolation, the four texels that form a rectangle that encloses a mapped pixel are interpolated to calculate the texture related value of the mapped pixel. For example, the sample point 116 is enclosed within a rectangle formed by the following four texels: texel (s,t), texel (s,t+1), texel (s+1, t), and texel (s+1,t+1). The value of the pixel 106 that maps to the sample point 116 is calculated according to the following bilinear interpolation equation. In the following, the notation "texel[s,t]" refers to the value (such as color, intensity, transparency, etc.) of a texel (s,t).

$$\text{value} = \text{texel}[s, t] * (1 - sf) * (1 - tf) + \quad \text{Equation 1}$$
$$\text{texel}[s + 1, t] * (sf) * (1 - tf) +$$
$$\text{texel}[s, t + 1] * (1 - sf) * (tf) + \text{texel}[s + 1, t + 1] * (sf) * (tf)$$

Multiplication operations are expensive in computer time and/or hardware cost. Thus, Equation 1 is often factored into three linear interpolations, two in the S axis and one in the T axis. This is shown in Equation 2.

$$\text{partial\_}a = \text{texel}[s, t] + (\text{texel}[s + 1, t] - \text{texel}[s, t]) * sf \quad \text{Equation 2}$$
$$\text{partial\_}b = \text{texel}[s, t + 1] + (\text{texel}[s + 1, t + 1] - \text{texel}[s, t + 1]) * sf$$
$$\text{value} = \text{partial\_}a + (\text{partial\_}b - \text{partial\_}a) * tf$$

Thus, a bilinear interpolation operation requires three adds, three subtracts, and three multiplies on a particular value (such as color, intensity, transparency, etc.) of four texels.

A bilinear interpolation operation must be performed for each value of interest. For example, if one wishes to calculate a color value and an intensity value of a mapped pixel, then one must perform a bilinear interpolation operation using the color values of the four surrounding texels. Then, one must perform a bilinear interpolation operation using the intensity values of the four surrounding texels.

SUMMARY OF THE INVENTION

The present invention is directed to a computer graphics system and method for texture mapping using triangular interpolation. In other words, in the present invention, triangular interpolation (instead of bilinear interpolation) is used to calculate the values of pixels mapped from an image space to a texture space. Triangular interpolation requires less mathematical operations than bilinear interpolation.

More particularly, the present invention is directed to a system and method for texture mapping in a computer graphics system. The invention maps a pixel from an image space to a sample point in a texture space. The sample point has coordinates (si+sf, ti+tf). The invention identifies the three texels in the texture space that form a triangular region enclosing the sample point. The invention determines whether the triangular region represents a lower region or an upper region. If the triangular region represents a lower region, then a texture related value of the pixel mapped to the sample point is calculated by triangular interpolating on corresponding texture related values of the three texels according to the following equation:

$$\text{texture related value} = \text{texel}[s,t] + (\text{texel}[s+1,t] - \text{texel}[s,t]) * sf + (\text{texel}[s,t+1] - \text{texel}[s,t]) * tf.$$

If, instead, the triangular region represents an upper region, then a texture related value of the pixel mapped to the sample point is calculated by triangular interpolating on corresponding texture related values of the three texels according to the following equation:

$$\text{texture related value} = \text{texel}[s + 1, t + 1] +$$
$$(\text{texel}[s, t + 1] - \text{texel}[s + 1, t + 1]) * (1 - sf) +$$
$$(\text{texel}[s + 1, t] - \text{texel}[s + 1, t + 1]) * (1 - tf).$$

The invention determines whether the triangular region represents a lower region or an upper region as follows. The invention determines that the triangular region represents an upper region if the sample point satisfies the following:

$$sf+tf>=1.$$

The invention determines that the triangular region represents a lower region if the sample point satisfies the following:

$$sf+tf<1.$$

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a computer graphics system and method for texture mapping using triangular interpolation. In the present invention, triangular interpolation (instead of bilinear interpolation) is used to calculate the texture related values of pixels mapped from an image space to a texture space. Triangular interpolation is advantageous because it requires less mathematical operations than bilinear interpolation.

Triangular interpolation reduces the number of arithmetic operations by splitting the rectangular texture region into two triangular regions, and forming a weighted sum of the three texels that form the triangle that encloses the mapped pixel of interest.

Figure 1:
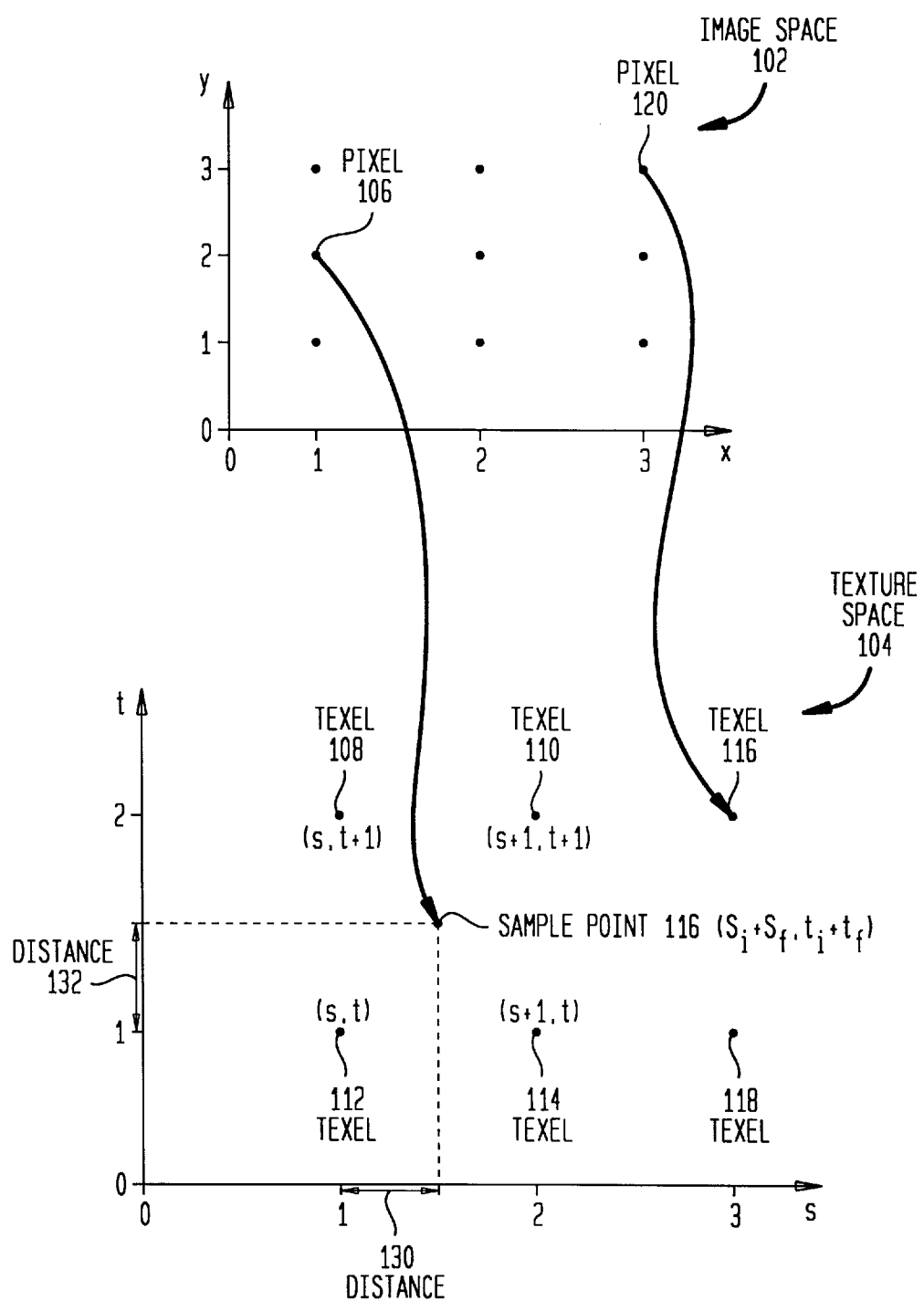
FIG. 1 is used to describe conventional bilinear interpolation.
Figure 2:
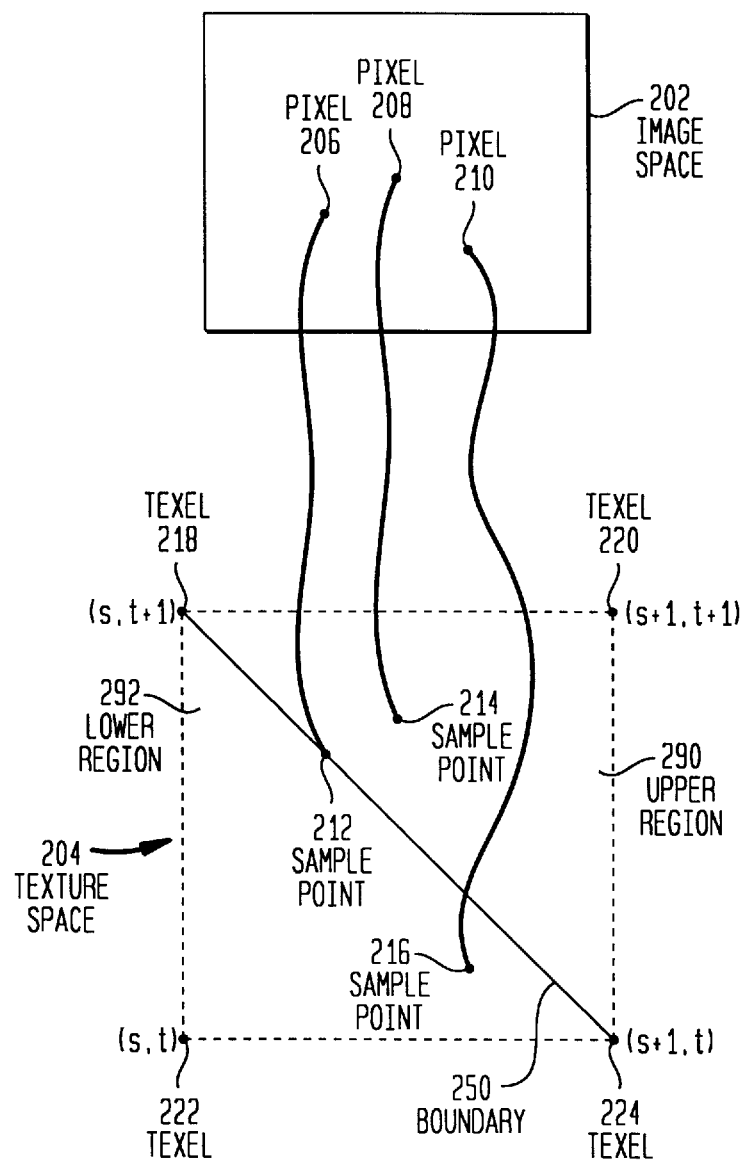
FIG. 2 is used to describe triangular interpolation according to the present invention.

Consider FIG. 2, which depicts a portion of an image space 202 and a portion of a texture space 204. Pixels 206, 208, and 210 in the image space 202 all map to a rectangular texture region of the texture space 204 formed by the following four texels: texel (s,t), texel (s+1,t), texel (s,t+1), and texel (s+1,t+1). According to the present invention, this rectangular texture region is divided into an upper region 290 and a lower region 292 divided by a boundary line 250. Each point in the lower region preferably satisfies Equation 3A.

$$sf+tf<1 \qquad \text{Equation 3A}$$

Each point in the upper region preferably satisfies Equation 3B.

$$sf+tf>=1 \qquad \text{Equation 3B}$$

Alternatively, each point in the lower region satisfies sf<=tf, and each point in the upper region satisfies sf>tf.

Alternatively, each point in the lower region satisfies sf<tf, and each point in the upper region satisfies sf>=tf.

Alternatively, each point in the lower region satisfies sf+tf<=1, and each point in the upper region satisfies sf+tf>1.

The upper and lower triangular regions 290, 292 represent barycentric coordinate systems.

According to the present invention, the texture related values of a pixel mapped to a sample point in the texture space 204 is calculated based on the texture related values of the three texels that form the triangle that encloses the sample point. For example, pixel 208 maps to sample point 214 in the upper triangular region 290. Thus, the value of pixel 208 is calculated based on texel (s+1,t), texel (s,t+1), and texel (s+1,t+1) that form the upper triangular region 290. Pixel 210 maps to sample point 216 in the lower triangular region 292. Thus, the value of pixel 210 is calculated based on texel (s,t), texel (s+1,t), and texel (s,t+1) that form the lower triangular region 292. Pixel 206 maps to a sample point 212 that falls directly on the boundary line 250. In the preferred embodiment, points on the boundary line 250 are considered to be in the upper triangular region 290. Thus, the value of pixel 206 is calculated based on texel (s+1,t), texel (s,t+1), and texel (s+1,t+1) that form the upper triangular region 290.

Each sample point 212, 214, 216 has coordinates (si+sf, ti+tf), where si and ti are the integer components in the S and T axes, respectively, and sf and tf are the fractional components in the S and T axes, respectively.

The value of a pixel that maps to the lower region 292 is calculated according to the following triangular interpolation equation.

$$\text{value} = \text{texel}[s, t] * (1 - sf) * (1 - tf) + \qquad \text{Equation 4}$$
$$\text{texel}[s + 1, t] * (sf) + \text{texel}[s, t + 1] * (tf)$$

Equation 4 factors to Equation 5.

$$\text{value}=\text{texel}[s,t]+(\text{texel}[s+1,t]-\text{texel}[s,t]) * sf+(\text{texel}[s,t+1]-\text{texel}[s,t]) * tf \qquad \text{Equation 5}$$

The value of a pixel that maps to the upper region 290 is calculated according to the following triangular interpolation equation.

$$\text{value} = \text{texel}[s + 1, t + 1] * (sf) * (tf) + \qquad \text{Equation 6}$$
$$\text{texel}[s + 1, t] * (1 - sf) + \text{texel}[s, t + 1] * (1 - tf)$$

Equation 6 factors to Equation 7.

$$\text{value}=\text{texel}[s+1,t+1]+(\text{texel}[s,t+1]-\text{texel}[s+1,t+1]) * (1-sf)+(\text{texel}[s+1,t]-\text{texel}[s+1,t+1]) * (1-tf) \qquad \text{Equation 7}$$

As evident by Equations 5 and 7, triangular interpolation requires two adds, two subtracts, and one multiply on three texel data values. This is a significant savings in time and/or hardware cost in comparison with bilinear interpolation. Triangular interpolation results in a slight reduced image quality because only three texels instead of four are interpolated. In many applications, however, such reduction in image quality is acceptable.

Structure of the Invention

Figure 3:
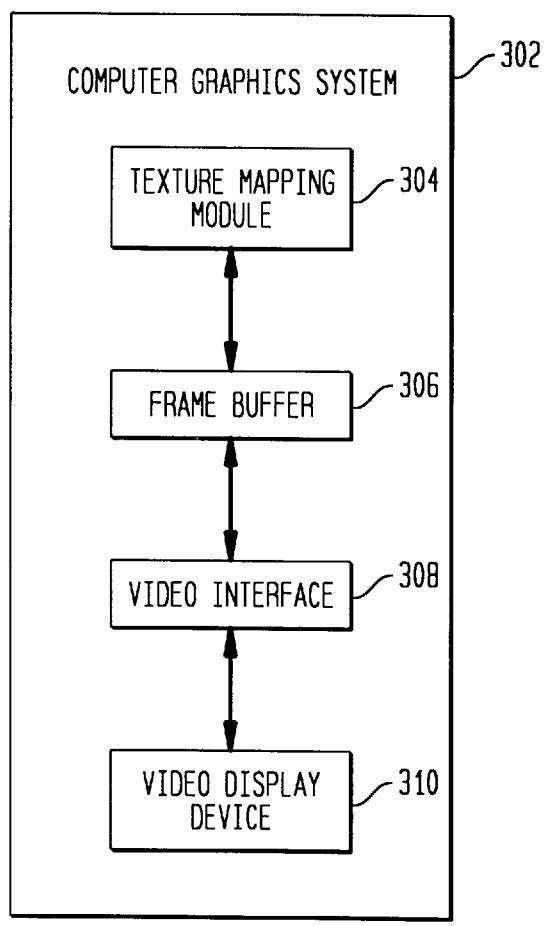
FIG. 3 is a block diagram of a computer graphics system according to a preferred embodiment of the present invention.

FIG. 3 is a block diagram of a computer graphics system 302 according to a preferred embodiment of the present invention. The computer graphics system 302 includes a texture mapping module 304 which constructs (i.e., renders) images that are ultimately displayed on a video display device 310. The texture mapping module 304 performs texture mapping using triangular interpolation. The operation of the texture mapping module 304 is described further below. The texture mapping module 304 performs other rendering tasks. However, these other rendering tasks are beyond the scope of this invention and, thus, are not described further.

The texture mapping module 304 stores image data in a frame buffer 306. This image data is transferred to a video interface 308. The video interface 308 processes and then transfers the image data to the video display device 310 for display to viewers.

The structure and operation of the frame buffer 306, the video interface 308, and the video display device 310 are well known, and are described in a number of publicly available references, such as James D. Foley and Andries Van Dam, *Fundamentals of Interactive Computer Graphics*, second edition, Addison-Wesley Publishing Co., 1990, 1982, and Roy Latham, *The Dictionary of Computer Graphics Technology and Applications*, Springer-Verlag, New York, 1991, which are herein incorporated by reference in there entireties. These references also generally describe texture mapping.

Figure 4:
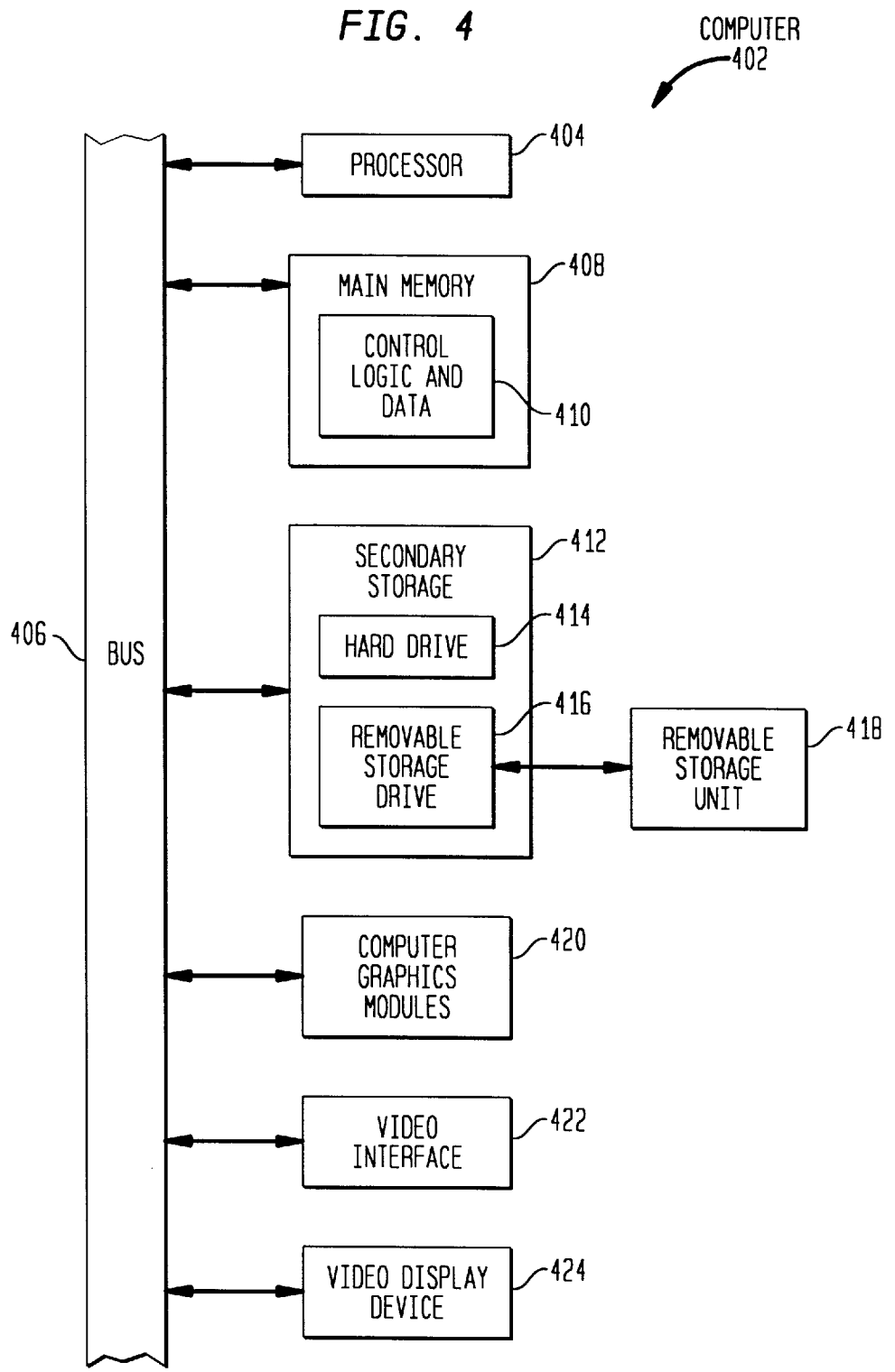
FIG. 4 is a block diagram of a computer useful for implementing elements of the invention.

The computer graphics system 302 is preferably implemented using a computer, such as the computer 402 shown in FIG. 4. The computer 402 may be, for example, a Challenge, Power Challenge, or Onyx computer available from Silicon Graphics Inc. of Mountain View, Calif. The invention is not limited to these particular implementations. Instead, the invention may be implemented using any general purpose computer having sufficient processing power and functionality.

The computer 402 includes one or more processors, such as processor 404. The processor 404 is connected to a communication bus 406.

The computer 402 also includes a main memory 408. Control logic (software) and data 410 are stored in the main memory 408. The main memory 408 is preferably random access memory (RAM).

The computer 402 also includes a secondary storage 412. The secondary storage 412 includes, for example, a hard disk drive 414 and/or a removable storage drive 416, representing a floppy disk drive, a magnetic tape drive, a compact disk drive, etc. The removable storage drive 416 reads from and/or writes to a removable storage unit 418 in a well known manner.

Removable storage unit 418, also called a program storage device or a computer program product, represents a floppy disk, magnetic tape, compact disk, etc. As will be appreciated, the removable storage unit 418 includes a computer usable storage medium having stored therein computer software and/or data.

Computer programs (also called computer control logic) are stored in main memory 408 and/or the secondary storage 412. Such computer programs, when executed, enable the computer 402 to perform the features of the present invention as discussed herein. In particular, the computer programs, when executed, enable the processor 404 to perform the features of the present invention. Accordingly, such computer programs represent controllers of the computer 402. In one embodiment, the texture mapping module 304 represents a computer program executing in the computer 402. In another embodiment, the texture mapping module 304 is implemented as a state machine.

In another embodiment, the invention is directed to a computer program product comprising a computer readable medium having control logic (computer software) stored therein. The control logic, when executed by the processor 404, causes the processor 404 to perform the functions of the invention as described herein.

In one embodiment, the computer 402 includes computer graphics modules 420, which may represent the texture mapping module 304 and/or frame buffer 306, for example.

The computer 402 also includes a video interface 422 and a video display device 424 (i.e., a computer monitor).

Operation of the Invention

Figure 5:
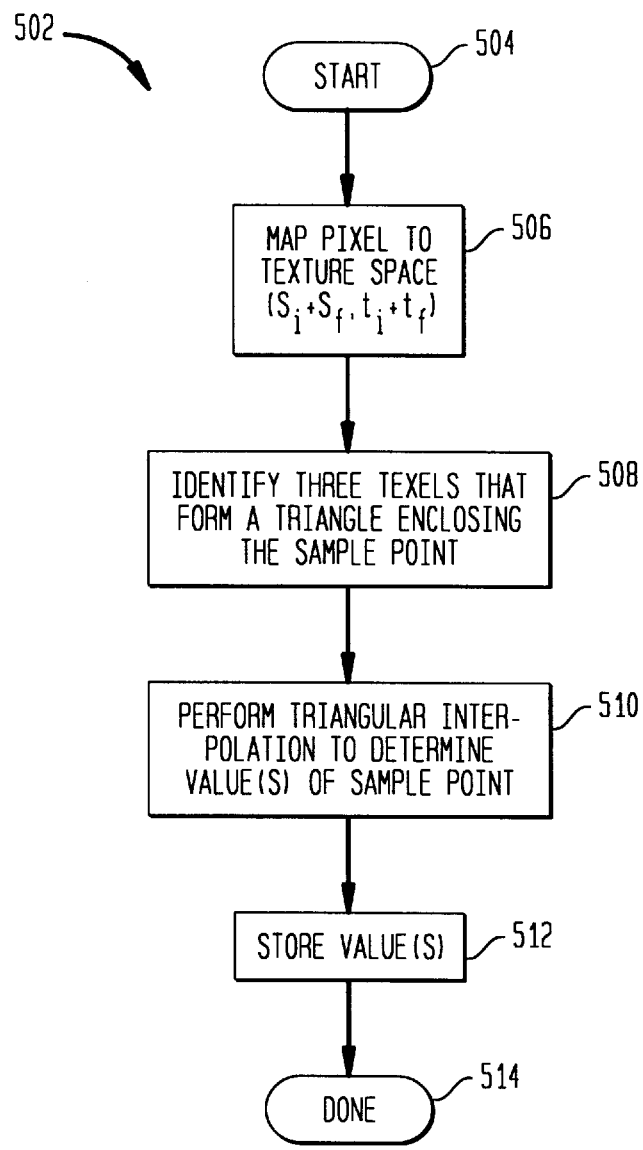
FIGS. 5 and 6 are flowcharts representing the preferred operation of the present invention.

The manner in which the texture mapping module 304 performs texture mapping using triangular interpolation shall now be described with reference to a flowchart 502 shown in FIG. 5. Flowchart 502 represents the operation of the texture mapping module 304 when determining the value(s) (such as color, intensity, transparency, etc.) of a pixel based on texture values. The texture mapping module 304 performs the steps of flowchart 502 for each pixel that is mapped from the image space to the texture space. Flowchart 502 begins with step 504, where control immediately-passes to step 506.

In step 506, the texture mapping module 304 maps a pixel from an image space 202 to a texture space 204 in a well known manner. For illustrative purposes, assume that in step 506 the texture mapping module 304 maps pixel 208 in the image space 202 to a sample point 214 in the texture space 204.

In step 508, the texture mapping module 304 identifies the three texels in the texture space 204 that form a triangle enclosing the sample point 214. With respect to the example of FIG. 2, the sample point 214 is enclosed within a triangle 290 (also called upper region 290) formed by the following three texels: texel (s+1,t), texel (s,t+1), and texel (s+1,t+1).

In step 510, the texture mapping module 304 performs one or more triangular interpolation operations on the values of the three texels identified in step 508 in order to calculate the values of the pixel 208. For example, if the texels each have a color value, an intensity value, and a transparency value, then the texture mapping module 304 in step 510 performs a first triangular interpolation operation on the color values, a second triangular interpolation operation on the intensity values, and a third triangular interpolation operation on the transparency values.

In step 512, the texture mapping module 304 stores the value(s) of the pixel 208 in the frame buffer 306 in a well known manner. Eventually, the value(s) of the pixel are displayed on the video display device 310 in a well known manner.

Flowchart 502 is complete after step 512 is performed, as indicated by step 514.

Figure 6:
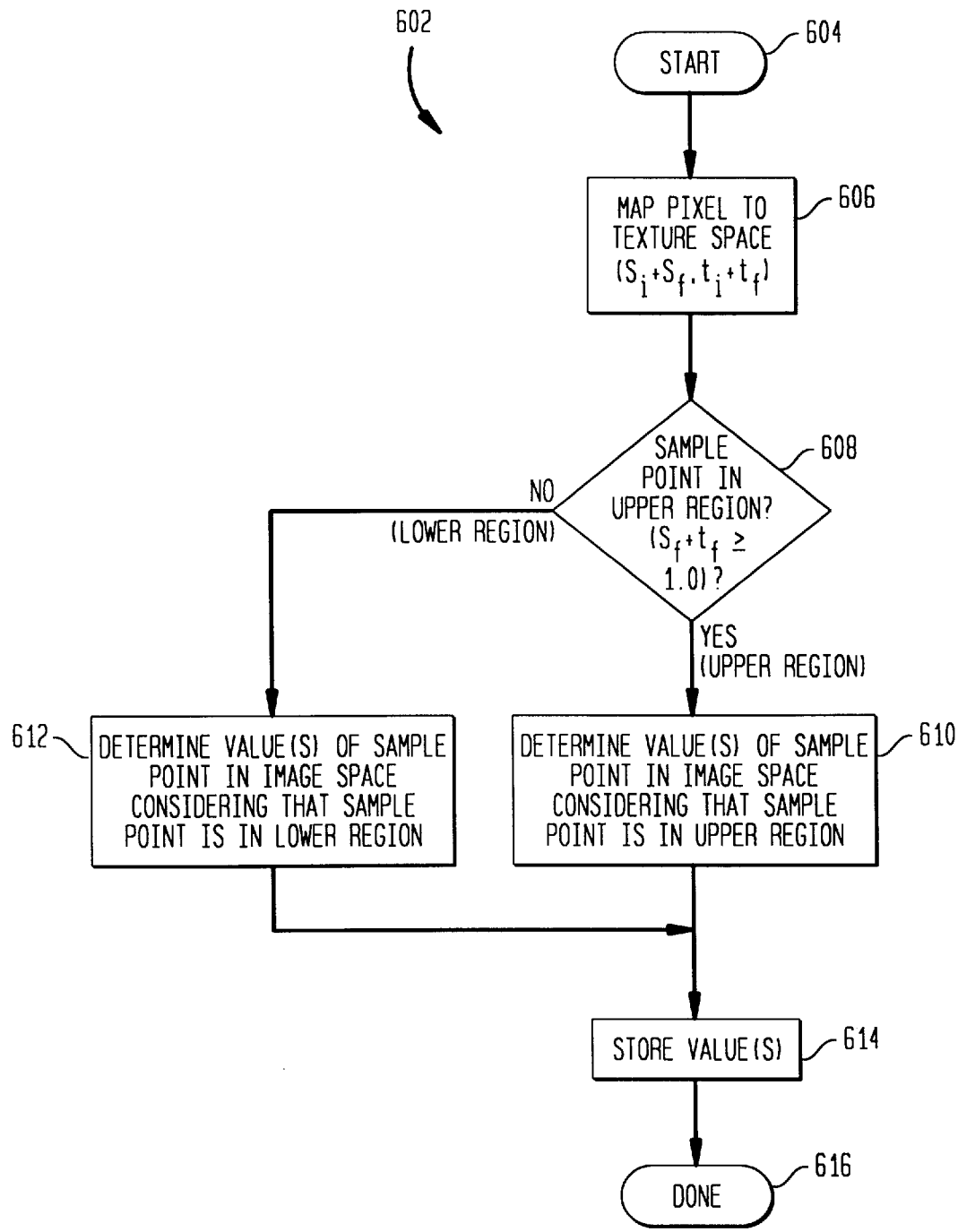

FIG. 6 is a flowchart 602 depicting in greater detail the operation of the texture mapping module 304 when performing texture mapping using triangular interpolation. Flowchart 602 begins with step 604, where control immediately passes to step 606.

In step 606, the texture mapping module 304 maps a pixel from the image space 202 to a sample point in the texture space 204 in a well known manner. The sample point has coordinates (si+sf, ti+tf).

In step 608, the texture mapping module 304 identifies the three texels in the texture space 204 that form a triangle enclosing the sample point. Also in step 608, the texture mapping module 304 determines whether this triangle represents an upper region, such as upper region 290. The triangle represents an upper region if the sample point preferably satisfies the following:

$$sf+tf>=1.0 \qquad \text{Equation 8}$$

If the texture mapping module 304 determines that the triangle represents an upper region, then the texture mapping module 304 in step 610 calculates the value(s) of the pixel as mapped to the sample point according to Equation 7.

If the texture mapping module 304 in step 608 determines that the triangle does not represent an upper region, then the triangle must represent a lower region, such as lower region 292. As a result, the texture mapping module 304 in step 612 calculates the value(s) of the pixel as mapped to the sample point according to Equation 5.

In step 614, the texture mapping module 304 stores the value(s) of the pixel 208 in the frame buffer 306. Eventually, the value(s) of the pixel are displayed on the video display device 310.

Flowchart 602 is complete after step 614 is performed, as indicated by step 616.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for texture mapping in a computer graphics system, comprising the steps of:

(1) mapping a pixel from an image space to a sample point in a texture space, said sample point having coordinates (si+sf, ti+tf);

(2) identifying three texels in said texture space forming a triangular region enclosing said sample point;

(3) determining whether said triangular region represents a lower region or an upper region;

(4) if said triangular region represents a lower region, then calculating a texture related value of said pixel mapped to said sample point by triangular interpolating on corresponding texture related values of said three texels according to a first equation:

texture related value=texel[$s,t$]+(texel[$s+1,t$]−texel[$s,t$]) * $sf$+(texel[$s,t+1$]−texel[$s,t$]) * $tf$;

and (5) if said triangular region represents an upper region, then calculating a texture related value of said pixel mapped to said sample point by triangular interpolating on corresponding texture related values of said three texels according to a second equation:

texture related value = texel[$s + 1, t + 1$] +

(texel[$s, t + 1$] − texel[$s + 1, t + 1$]) * (1 − $sf$) +

(texel[$s + 1, t$] − texel[$s + 1, t + 1$]) * (1 − $tf$).

2. The method of claim 1, further comprising the step of:

(6) storing said texture related value in a frame buffer.

3. The method of claim 1, wherein steps (1) through (5) are performed for each pixel in said image space.

4. The method of claim 1, wherein step (3) comprises the step of:

determining that said triangular region represents an upper region if said sample point satisfies one of the following:

$sf+tf>=1$;

sf>tf;

sf>=tf;

or $sf+tf>1$;

determining that said triangular region represents a lower region if said sample point satisfies one of the following:

$sf+tf<1$;

sf<=tf;

sf<tf;

or $sf+tf<=1$.

5. A method for texture mapping in a computer graphics system, comprising the steps of:

(1) mapping a pixel from an image space to a sample point in a texture space;

(2) identifying three texels in said texture space forming a triangular region enclosing said sample point; and (3) calculating a texture related value of said pixel mapped to said sample point in said texture space by triangular interpolating on corresponding texture related values of said three texels.

6. The method of claim 5, further comprising the step of:

(4) storing said texture related value in a frame buffer.

7. The method of claim 5, wherein steps (1) through (3) are performed for each pixel in said image space.

8. A computer graphics method, comprising the steps of:

(1) mapping a pixel from an image space to a sample point in a texture space, said sample point having coordinates (si+sf, ti+tf);

(2) identifying three texels in said texture space forming a triangular region enclosing said sample point;

(3) determining whether said triangular region represents a lower region or an upper region;

(4) if said triangular region represents a lower region, then calculating a texture related value of said pixel mapped to said sample point by triangular interpolating on corresponding texture related values of said three texels according to a first equation:

texture related value=texel[$s,t$]+(texel[$s+1,t$]−texel[$s,t$]) * $sf$+(texel[$s,t+1$]−texel[$s,t$]) * $tf$;

(5) if said triangular region represents an upper region, then calculating a texture related value of said pixel mapped to said sample point by triangular interpolating on corresponding texture related values of said three texels according to a second equation:

texture related value = texel[$s + 1, t + 1$] +

(texel[$s, t + 1$] − texel[$s + 1, t + 1$]) * (1 − $sf$) +

(texel[$s + 1, t$] − texel[$s + 1, t + 1$]) * (1 − $tf$);

(6) storing said texture related value calculated in step (4) or step (5) in a frame buffer; and (7) transferring said texture related value from said frame buffer to a video display device for display to a user.

9. The method of claim 8, wherein step (3) comprises the step of:

determining that said triangular region represents an upper region if said sample point satisfies one of the following:

$sf+tf>=1$;

sf>tf;

sf>=tf;

or $sf+tf>1$;

determining that said triangular region represents a lower region if said sample point satisfies one of the following:

$sf+tf<1$;

$sf<=tf$;

$sf<tf$;

or $sf+tf<=1$.

10. A computer graphics system, comprising:
   a frame buffer;
   a texture mapping module, coupled to said frame buffer, to construct an image and to store said image in said frame buffer;
   a video display device; and
   a video interface, coupled to said frame buffer and said video display device, to retrieve said image from said frame buffer and to display said retrieved image on said video display device;
   wherein said texture mapping module comprises:
      mapping means for mapping a pixel from an image space to a sample point in a texture space;
      texel identifying means for identifying three texels in said texture space forming a triangular region enclosing said sample point; and
      calculating means for calculating a texture related value of said pixel mapped to said sample point in said texture space by triangular interpolating on corresponding texture related values of said three texels, said texture related value being a portion of said image.

11. The computer graphics system of claim 10, wherein said calculating means comprises:
   region determining means for determining whether said triangular region represents a lower region or an upper region;
   means for calculating a texture related value of said pixel mapped to said sample point by triangular interpolating on corresponding texture related values of said three texels according to a first equation if said triangular region represents a lower region:

texture related value=texel[$s,t$]+(texel[$s+1,t$]−texel[$s,t$]) * $sf$+(texel[$s,t+1$]−texel[$s,t$]) * $tf$;

and
   means for calculating a texture related value of said pixel mapped to said sample point by triangular interpolating on corresponding texture related values of said three texels according to a second equation if said triangular region represents an upper region:

texture related value = texel[$s + 1, t + 1$] +

(texel[$s, t + 1$] − texel[$s + 1, t + 1$]) * (1 − $sf$) +

(texel[$s + 1, t$] − texel[$s + 1, t + 1$]) * (1 − $tf$).

12. The computer graphics system of claim 11, wherein said region determining means comprises:
   means for determining that said triangular region represents an upper region if said sample point satisfies one of the following:

$sf+tf>=1$;

$sf>tf$ $sf>=tf$;

or $sf+tf>1$;

means for determining that said triangular region represents a lower region if said sample point satisfies one of the following:

$sf+tf<1$;

$sf<=tf$;

$sf<tf$;

or $sf+tf<=1$.

13. A texture mapping module in a computer graphics system, said texture mapping module comprising:
   means for mapping a pixel from an image space to a sample point in a texture space, said sample point having coordinates (si+sf, ti+tf);
   means for identifying three texels in said texture space forming a triangular region enclosing said sample point;
   region determining means for determining whether said triangular region represents a lower region or an upper region;
   means for calculating a texture related value of said pixel mapped to said sample point by triangular interpolating on corresponding texture related values of said three texels according to a first equation if said triangular region represents a lower region:

texture related value=texel[$s,t$]+(texel[$s+1,t$]−texel[$s,t$]) * $sf$+(texel[$s,t+1$]−texel[$s,t$]) * $tf$;

and
   means for calculating a texture related value of said pixel mapped to said sample point by triangular interpolating on corresponding texture related values of said three texels according to a second equation if said triangular region represents a lower region:

texture related value = texel[$s + 1, t + 1$] +

(texel[$s, t + 1$] − texel[$s + 1, t + 1$]) * (1 − $sf$) +

(texel[$s + 1, t$] − texel[$s + 1, t + 1$]) * (1 − $tf$).

14. The texture mapping module of claim 13, wherein said region determining means comprises:
   means for determining that said triangular region represents an upper region if said sample point satisfies one of the following:

$sf+tf>=1$;

$sf>tf$;

$sf>=tf$;

or $sf+tf>1$;

means for determining that said triangular region represents a lower region if said sample point satisfies one of the following:

$sf+tf<1$;

$sf<=tf$;

$sf<tf$;

or $sf+tf<=1$.

15. A computer program product comprising a computer useable medium having computer program logic recorded thereon for enabling a processor in a computer system to perform texture mapping using triangular interpolation, said computer program logic comprising:

means for enabling said processor to map a pixel from an image space to a sample point in a texture space, said sample point having coordinates (si+sf, ti+tf);

means for enabling said processor to identify three texels in said texture space forming a triangular region enclosing said sample point;

region determining means for enabling said processor to determine whether said triangular region represents a lower region or an upper region;

means for enabling said processor to calculate a texture related value of said pixel mapped to said sample point by triangular interpolating on corresponding texture related values-of said three texels according to a first equation if said triangular region represents a lower region:

texture related value=texel[$s,t$]+(texel[$s$+1,$t$]−texel[$s,t$]) * $sf$+ (texel[$s,t$+1]−texel[$s,t$]) * $tf$;

and means for enabling said processor to calculate a texture related value of said pixel mapped to said sample point by triangular interpolating on corresponding texture related values of said three texels according to a second equation if said triangular region represents a lower region:

texture related value = texel[$s$ + 1, $t$ + 1] +

(texel[$s$, $t$ + 1] − texel[$s$ + 1, $t$ + 1]) * (1 − $sf$) +

(texel[$s$ + 1, $t$] − texel[$s$ + 1, $t$ + 1]) * (1 − $tf$).

16. The computer program product of claim 15, wherein said region determining means comprises:

means for determining that said triangular region represents an upper region if said sample point satisfies one of the following:

$sf+tf>=1$;

$sf>tf$;

$sf>=tf$;

or $sf+tf>1$;

means for determining that said triangular region represents a lower region if said sample point satisfies one of the following:

$sf+tf<1$;

$sf<=tf$;

$sf<tf$;

or $sf+tf<=1$.

* * * * *